United States Patent Office 3,752,742
Patented Aug. 14, 1973

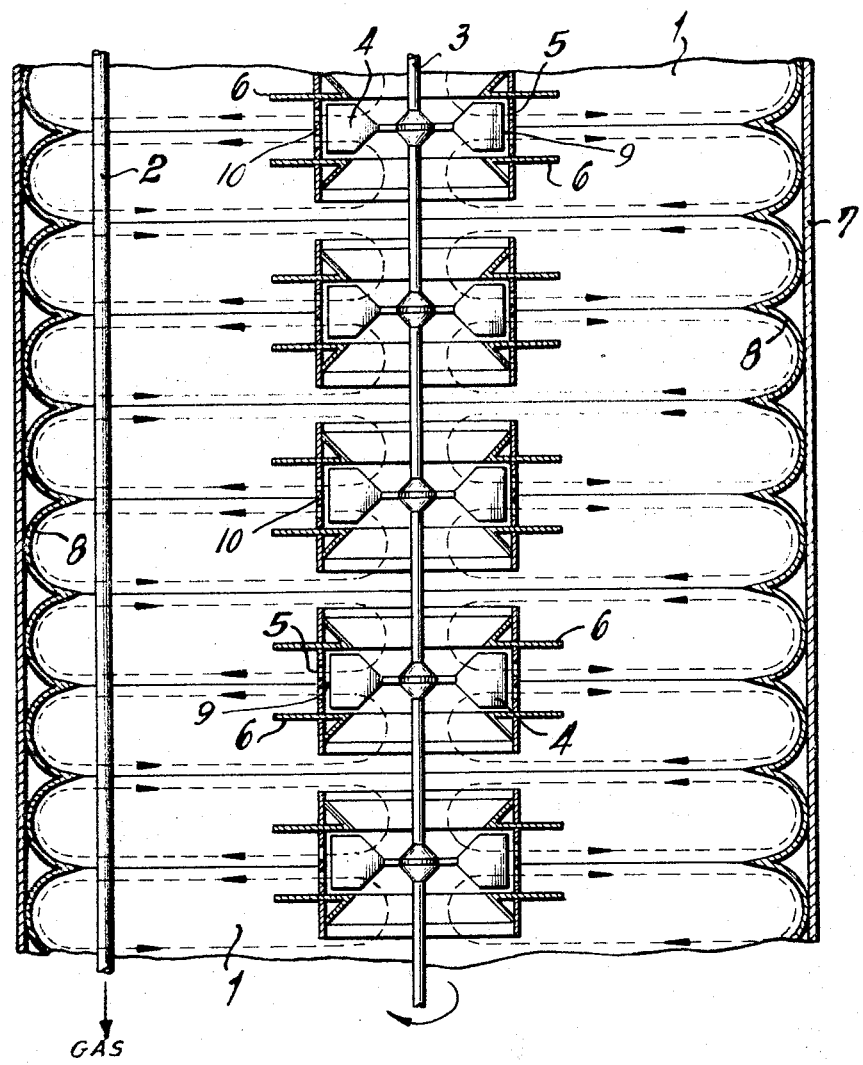

3,752,742
PROCESS AND APPARATUS FOR THE AEROBIC FERMENTATION OF SUBSTRATES
Gerhard Jaekel, Hurth-Hermulheim, Kurt Karrenbauer, Liblar, Eitel Goedicke, Hurth-Efferen, and Dieter Kirstein, Cologne, Germany, assignors to Knapsack Aktiengesellschaft, Knapsack, near Cologne, Germany
Filed Aug. 30, 1971, Ser. No. 175,815
Claims priority, application Germany, Aug. 31, 1970, P 20 43 077.7
Int. Cl. C12b 1/14
U.S. Cl. 195—109
2 Claims

ABSTRACT OF THE DISCLOSURE

Substrates are subjected to continuous aerobic fermentation or highly polluted effluent from organic chemical production facilities is continuously purified in the presence of micro-organisms in a biochemical reaction zone by aeration with an oxygen-containing gas. To this end the oxygen-containing gas is introduced into the biochemical reaction zone having a liquid phase therein, and while flowing therethrough, it is continually transformed with the resultant formation of fresh-surfaced gas bubbles and reduction of the time of contact between the gas in the bubbles and the liquid phase at any surface therebetween.

---

The present invention relates to a process and an apparatus for the continuous aerobic fermentation of substrates in the presence of micro-organisms in a biochemical reaction zone, and more particularly to the purification of highly polluted effluents from organic chemical production facilities, by aeration with an oxygen-containing gas.

Various containers or basins have been used heretofore for the aerobic fermentation of substrates and particularly for the purification of effluents which are circulated and aerated therein. In these containers or basins, material turnover and biological degradation capacity are relatively low, per unit of volume. The reasons for this are various and complicated, but the main reason is to be found in insufficient provision of oxygen, which critically and primarily determines the activity of the micro-organisms.

It is an object of the present invention to provide a process permitting the material turnover rate in the treatment of substrates, and particularly the degradation capacity of micro-organisms, in the purification of effluents, to be considerably improved, per unit of volume of reaction zone. A further object of the present invention is to provide an apparatus for carrying out the process for continuous transformation of the substrates, more particularly for biological degradation of substances present in highly polluted effluents, under technically and energetically attractive conditions.

The process of the present invention comprises more particularly introducing an oxygen-containing gas into a biochemical reaction zone having a liquid phase therein and, while flowing the gas through the liquid phase, continually transforming the shape of individual gas bubbles with the formation of fresh-surfaced gas bubbles and reduction of the time of contact between the gas in the bubbles and the liquid phase at any surface therebetween.

Further preferred features of the process of the present invention, which may be used singly or in combination, provide (a) for the mixture of oxygen-containing gas and liquid phase to be forced through a plurality of shearing zones, or
(b) for the mixture of oxygen-containing gas and liquid phase to be forced through a plurality of passageways.

An aeration device for carrying out the process of the present invention comprises a reactor which is provided with a gas inlet tube, a multi-stage agitator having a plurality of mixing elements, and structures affording annular sets of apertures around, and level with, the said mixing elements, the ratio of the reactor diameter to the agitator diameter being at least 2:1, preferably 4.5:1.

Further preferred features of the apparatus of the present invention, which may be used singly or in combination, provide (a) for the use of a multi-stage pump agitator,
(b) for the individual mixing elements to be spaced apart from one another at intervals corresponding substantially to the diameter of the individual mixing elements, and
(c) for each agitator stage to be provided with one or more baffle plates and flow-defining walls.

Previous proposals for improving the oxygen supply of micro-organisms have entailed such steps as, for example, introducing large quantities of oxygen-containing gas into the substrate, introducing finely divided oxygen-containing gas into the substrate and finely distributing the gas therein, producing heavy turbulence in the aerated substrate, or long contact times between gas bubbles and substrate, but these measures have been found to produce only a slight improvement in the oxygen supply, which critically determines the degradation capacity of the micro-organisms.

Only by the application of the present invention have we found it possible considerably to improve the degradation capacity of micro-organisms. In accordance therewith, conditions favourable to the life and growth of micro-organisms are established so as to ensure a highly specific biological degradation capacity. To this end, the invention allows for the oxygen to be introduced at increased speed into, and to be passed through, the liquid phase, and provides for the oxygen-containing gas bubbles flowing therethrough to be continually transformed into fresh-surfaced gas bubbles so as to ensure a reduction of the time of contact between the gas in the bubbles and liquid phase at any surface therebetween.

It is imperative that the surfaces of the gas bubbles should be continually transformed. Failing this, the individual gas bubbles and liquid phase are separated from each other by a stationary boundary layer formed therebetween, which inhibits the transfer of oxygen and impairs the micro-organisms' supply of oxygen which so critically determines the rate of highly specific biological aerobic conversions.

The rapid absorption of oxygen by the liquid phase must be coupled with rapid transport of oxygen through said phase, and more particularly with the rapid supply of oxygen to the living cells of the micro-organism. To achieve this, the invention provides for the mixture of oxygen-containing gas and liquid phase to be forced through a plurality of shearing zones. As a result, fresh-surfaced gas bubbles are continuously produced and the liquid phase is intimately mixed.

In order to minimize energy expenditure, to change the surfaces of the gas bubbles within as short a period of time as possible, and intimately to mix the liquid phase, the invention provides for the mixture of oxygen-containing gas and liquid phase to be forced through a plurality of passageways.

In clear contrast with the large-dimensioned containers or basins used heretofore for the aerobic fermentation of substrates, particularly for the purification of effluents, the present invention provides for the use of an aeration device comprising a reactor which can be relatively small in volume. In the interest of minimizing the energy consumption of the agitator, it is good practice to use mixing elements which are relatively small in diameter and to operate the agitator at a correspondingly increased speed and appropriate peripheral velocity.

In the accompanying drawing, the single figure is a diagrammatic side elevational view of an exemplary apparatus for carrying out the process of the present invention, which is not limited to the exemplary embodiment shown and admits of various modifications without departing from its scope.

As can be seen from the figure, an aeration reactor 1 having a cylindrical portion (only the cylindrical portion is shown) is fitted with a tubular gas inlet 2 and a central driving shaft 3. Fast with shaft 3 are mixing elements 4 arranged serially, i.e. with one downstream of another. Four stirring arms are provided if the elements 4 are to act as stirrers, while impeller wheels are provided if they are to act as a pump type of agitator.

As shown in the accompanying drawing, mixing elements 4 run past apertures 5 which are arranged as an annular set so as to form shearing zones 9. Apertures 5 are represented by perforations in sheet metal cylinders 10 if the elements 4 comprise stirring arms, and by perforations in the peripheral portion of the pump casing if the elements 4 comprise impeller wheels of a pump agitator. Fast with the structures affording apertures 5 are baffle plates 6, which are arranged at right angles to driving shaft 3 and on the side of the said structure remote from shaft 3. Each of the indivdiual aeration zones is provided with a flow-defining wall 8, which projects thereinto from the outer wall 7 of the reactor, so that the liquid phase is constrained to flow in pathways defined by the directions of the arrows and broken lines in the drawing to recirculate the mixture back through the mixing elements and shearing zones.

The following examples illustrate the invention.

EXAMPLE 1 (PRIOR ART PROCESS)

An effluent from an organic chemical production facility with a $BOD_5$-value of 3,900 milligrams per liter was continuously aerated and mixed, with addition of nutrient salts, while maintaining a pH-value appropriate to the substrate used. ("BOD" stands for "biochemical oxygen demand.")

The specific biological degradation capacity was found to be 7.5 kg. of $BOD_5$ per cubic meter of effective container volume, per day. Degradation occurred at the rate of 87%.

0.4 kilowatt-hour of energy was required per kg. of oxygen supplied.

EXAMPLE 2 (PROCESS OF INVENTION)

An effluent from an organic chemical production facility with a $BOD_5$-value of between 8,000 and 12,000 milligrams per liter and considerable proportions of difficultly degradable substances therein, was continuously and intimately aerated and mixed in an aerator designed in accordance with the present invention, with addition of nutrient salts, while strictly maintaining a pH-value appropriate to the substrate used.

The specific biological degradation capacity was found to be higher than 70 kg. of $BOD_5$ per cubic meter of effective container volume, per day, under commercial conditions.

Degradation to an extent of more than 96% was consistently obtained.

About 1.3 kilowatt-hour of energy was specifically required per kg. of degraded $BOD_5$. This corresponded to about 1.1 kilowatt-hour per kg. of oxygen supplied. More than 50 percent of the oxygen contained in the air was found to have been utilized.

We claim:

1. A process for the continuous purification of highly polluted effluent from an organic chemical production facility in the presence of micro-organisms in a biochemical reaction zone by aeration with an oxygen-containing gas, wherein the oxygen-containing gas is introduced into the biochemical reaction zone having a liquid phase therein, the process comprising forcing the mixture of oxygen-containing gas in bubbles and liquid phase radially outwardly through a plurality of shearing zones in which the shapes of substantially all of the gas bubbles being forced radially outwardly are continuously transformed into fresh-surfaced gas bubbles continuously produced into the reaction zone in which the fresh-surfaced gas bubbles facilitate the biochemical reaction, forcing the mixture to flow through defined paths and deflecting the direction of flow of the mixture in the paths radially inwardly by means of curved guide plates projecting from the outer wall of the reaction zone to recirculate the mixture back into and outwardly through the shearing zones whereby the continuous formation of fresh surfaces for individual gas bubbles is effected and the time of contact between stable gas bubbles and the liquid phase is reduced.

2. A process as set forth in claim 1 wherein the shearing zones are axially spaced from each other and the deflection is peripheral to the shearing zones.

References Cited
UNITED STATES PATENTS
3,625,834  12/1971  Muller _____ 195—109

LIONEL M. SHAPIRO, Primary Examiner

R. J. WARDEN, Assistant Examiner

U.S. Cl. X.R.

195—115, 142, 143; 210—15